May 3, 1938. P. K. FROLICH 2,115,846
PROCESS FOR OBTAINING VALUABLE PRODUCTS FROM PETROLEUM RESIDUES
Filed March 17, 1933
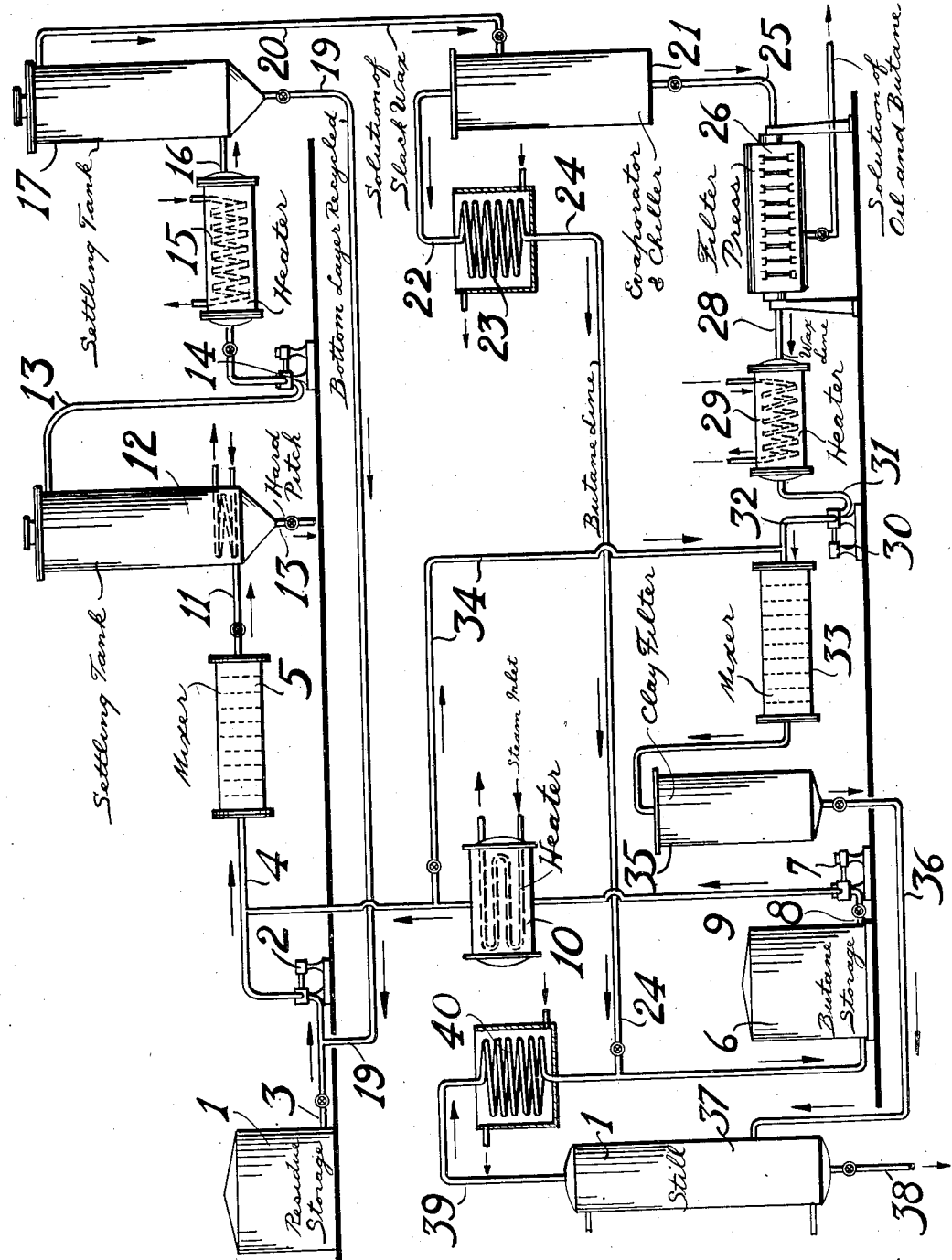
Per K. Frolich Inventor
W. E. Currie Attorney Patented May 3, 1938

2,115,846

UNITED STATES PATENT OFFICE 2,115,846

PROCESS FOR OBTAINING VALUABLE PRODUCTS FROM PETROLEUM RESIDUES

Per K. Frolich, Roselle, N. J., assignor to Standard Oil Development Company, a corporation of Delaware Application March 17, 1933, Serial No. 661,202

6 Claims. (Cl. 196—13)

This invention relates to petroleum residues, and more particularly is concerned with a method for obtaining valuable products therefrom.

By the term "petroleum residues" is meant not only that portion of petroleum which remains after all motor fuel and lubricating fractions have been removed, but also the residues remaining after vaporizable products have been distilled from heavy petroleum oils subjected to cracking or destructive hydrogenation. These residues are usually black in color and in such form are not particularly adapted to any purpose other than for use as fuel.

The present invention provides a method for recovering from such residues hard pitches useful as substitutes for gilsonite, waxes of higher melting point than those ordinarily obtained from petroleum fractions by the usual dewaxing methods, and oily fractions of extremely high viscosity useful for blending with lighter oils or for other purposes for which a highly viscous oil is needed.

It will be understood that the nature of the products obtained from any particular residue will depend to a large extent upon the type of crude from which the residue is derived.

The invention will be fully understood from the following description read with reference to the accompanying drawing which is a semi-diagrammatic view in sectional elevation of a type of apparatus suitable for carrying out the process.

Referring to the drawing, numeral 1 designates a supply tank of the petroleum residue to be treated. Pump 2 draws residue from tank 1 through line 3 and forces it through line 4 into a mixing device 5 which may be of the orifice type shown or any other suitable type. Numeral 6 designates a supply tank of the solvent to be used in the process. This solvent comprises a light hydrocarbon such as propane, butane, isobutane or mixtures of these. For convenience in description the solvent may be considered to be butane. It will be understood that pressure is maintained sufficient to retain the butane in liquid phase at the temperature of working.

Pump 7 draws butane from tank 6 through line 8 and forces it through line 9 and a heating means 10 into line 4 where it passes with the residue into and through mixer 5. From mixer 5, the mixture of residue and butane flows through line 11 into a settling tank 12 wherein a precipitate of hard pitch thrown out of the residue by the butane is allowed to settle and is drawn off through line 13.

The supernatant liquid above is removed from settling tank 12 through line 13 and is forced by pump 14 into and through a heating means 15 wherein the mixture is heated to a temperature higher than that of the mixture entering settling tank 12. From heater 15 the mixture flows through line 16 into a second settling tank 17 which may be substantially similar to tank 12. The heating of the mixture causes it to separate into two liquid layers. These layers are separated in tank 17 and the bottom layer is removed therefrom and returned through line 19 to the stream entering mixing device 5.

The top layer in settling tank 17 is removed therefrom by line 20 and is discharged into a chiller 21 wherein the mixture is chilled to a temperature at which wax is caused to precipitate. The chilling may be accomplished by external means, but is more conveniently accomplished by evaporating a portion of the butane which causes a substantial reduction in temperature. The evaporated butane passes out of the chiller through line 22, flows through a condenser 23 and thence is returned by line 24 to butane supply tank 6.

The mixture in chiller 21 which contains precipitated wax is withdrawn through line 25 and is forwarded to a wax separation means such as filter press 26, for example, wherein the wax is separated from the solution. The filtrate comprising butane and heavy oil is removed from the filter press through line 27 and may thereafter be introduced into a distillation means (not shown) wherein the butane may be separated from the heavy oil and may be thereafter condensed and returned to the butane supply tank 6.

The wax removed by filter press 26 is removed through line 28, is passed through a heating means 29 and is then drawn by pump 30, through line 31 and forced through line 32 into a mixing device 33 wherein it may be mixed with hot butane supplied thereto by means of line 34. The solution of wax in hot butane is then passed through a contact filtration means 35. The filtrate flows through line 36 into a distillation means 37 wherein the butane is removed. The purified wax is withdrawn from the still through line 38. The evaporated butane passes out of the still through line 39, is condensed in condenser 40 and is returned to butane supply tank 6 through line 41.

In the operation of the process, the residue is preferably treated at or above its melting point. This temperature naturally depends upon the particular residue selected for treatment but in general will vary between say 200 and 300° F.

The solvent used must be one that may be retained in liquid phase at this temperature. Butane and iso-butane are the most satisfactory solvents for most residues, although petroleum ether or mixtures of butane or propane with petroleum ether may also be used with satisfactory results.

The proportion of solvent to residue may vary from 5 to 10 volumes for each volume of residue, but ratios of 6 to 8 to 1 are preferred.

The temperature maintained in the first extraction in which a hard pitch is thrown out may be from 200 to 250° F. In the second extraction with butane wherein the remaining mixture is separated into two liquid layers the temperature should be from 50 to 75° F. higher, say between 250 and 330° F. It will be understood that as the solvent is heated its density decreases and its solvent power for the heavier constituents of the residue also decreases.

The pressure necessary to maintain the solvent in liquid phase at the temperature of working will, in the case of butane, vary between say 15 and 35 atmospheres, although it will be understood that the lighter the solvent selected the higher the required pressure will be.

The following example of the treatment according to the present process of a residue derived from a Sumatra crude will illustrate the practical use of the process and will show the types of valuable products that may be obtained thereby. It should be understood, however, that the process is not limited to treatment of residues obtained from Sumatra crudes.

One volume of pitch bottoms derived from Talang Akar (Sumatra) crude is mixed with 9 volumes of butane. The mixture is heated in a closed bomb to 248° F. under pressure of 19 atmospheres. A hard pitch is thrown out and this is drawn off from the bomb.

The remaining solution is then heated further to 293–302° F. pressure being increased to about 29 atmospheres. The solution is thereby caused to separate into two liquid layers. The bottom layer is removed and is added to fresh residue used for the next treatment.

The top layer is then chilled to about 32° F. and is filtered at this temperature. The wax obtained has a melting point of 186° F.

The filtrate is distilled in order to remove the butane and a highly viscous oil of 95° F. pour point is obtained.

The yields of hard pitch, high melting point wax and heavy oil obtained based on the original pitch bottoms are as follows:

| | Per cent |
|---|---|
| Hard pitch | 41.3 |
| Wax, 186° F. M. P | 14.8 |
| Heavy oil | 41.7 |

The wax obtained above is redissolved in 3 volumes of butane and percolated through a clay at 212° F. A purified wax of 2½ Robinson color and melting point of 188° F. is obtained.

The heavy oil is purified by percolation through clay, and thereafter has the following inspection:

| | |
|---|---|
| Gravity, A. P. I | 16½° |
| Saybolt viscosity @ 210° F | 1373 seconds |
| Pour point | 85° F. |
| Conradson carbon | 4.9% |

The hard pitch obtained in the first extraction has a flash point above about 500° F. and is solid at normal temperatures. It is similar in properties to gilsonite #2 and may be used in asphalt paints, pipe coatings, as a hardening agent for other asphalts and for all other purposes for which gilsonite #2 is used with equivalent and in some cases better results.

Various modifications of the process may be made as will be understood. For example, in place of decreasing the density of the solvent in the second extraction step by increasing the temperature, the same effect can be obtained by adding a lighter solvent such as propane or ethane and keeping the temperature the same. Also, the method of separating the wax from the heavy oil is subject to wide variation depending upon the melting point, degree of purity and quantity of wax sought to be obtained.

The purified hard wax is extremely tough and hard and is similar to a high melting point beeswax. It resembles a blend of ceresin and carnauba wax and may be used with very satisfactory results in floor polishes and waxes.

The viscous oil obtained is especially useful as a blending agent for lighter lubricating oils and is found to increase markedly the viscosity index of such oils.

This invention is not limited by any theory of the mechanism of the reactions nor by any details which have been given merely for illustrative purposes, but is limited only in and by the following claims in which I wish to claim all novelty inherent in the process.

I claim:

1. The method of obtaining valuable products from petroleum residues which comprises diluting the residue at a temperature of at least 200° F. with several volumes of liquefied butane, removing a hard pitchy material thereby caused to precipitate, heating the remaining solution to a temperature about 50° F. higher whereby the solution is caused to separate into two liquid layers, removing the bottom layer, chilling the top layer to a temperature at which wax is caused to precipitate, removing the wax so precipitated and recovering a heavy oil from the filtrate.

2. Process for obtaining hard pitch, wax of high melting point and oil of high viscosity from pitch bottoms derived from a Talang Akar crude which comprises diluting the pitch bottoms with 6 to 8 volumes of butane at a temperature between 200 and 250° F. and under pressure sufficient to retain the butane in liquid phase, removing a hard pitch which does not dissolve, heating the remaining solution to a temperature of about 300° F. whereby it is caused to separate into two liquid layers, removing the bottom layer and returning it to be treated with additional fresh residue, chilling the top layer to a temperature of at least 32° F., removing the high melting point wax so caused to precipitate, and recovering a highly viscous oil from the remaining solution.

3. Process according to claim 2 in which the wax is further purified by redissolving in several volumes of hot butane, percolating the solution through a bed of clay, and finally chilling the percolated solution and removing the butane therefrom.

4. Process according to claim 2 in which the highly viscous oil is further purified by percolation through a bed of clay.

5. Process according to claim 1 in which the residue is diluted with from 6 to 8 volumes of butane per volume of residue.

6. The method of obtaining valuable products from normally solid petroleum residues which comprises diluting the residue with a light hydrocarbon at a temperature above the melting point of the residue, removing hard pitchy material remaining undissolved, reducing the density of the light hydrocarbon solvent in the remaining solution by raising the temperature whereby the solution is caused to separate into two liquid layers, removing the bottom layer, chilling the top layer to a wax separation temperature, recovering the wax so precipitated and removing the light hydrocarbons from the remaining liquid.

PER K. FROLICH.